United States Patent [19]

Ogiwara et al.

[11] 4,295,781
[45] Oct. 20, 1981

[54] METHOD FOR OPERATING FLUID MACHINES IN SPINNING-IN-AIR MODE

[75] Inventors: Kenzyu Ogiwara; Minoru Kawada; Teiji Ashida, all of Hitachi, Japan

[73] Assignees: Hitachi, Ltd., Tokyo; Hitachi Service Engineering Co., Ltd., Ibaraki, both of Japan

[21] Appl. No.: 51,173

[22] Filed: Jun. 22, 1979

[30] Foreign Application Priority Data

Jul. 21, 1978 [JP] Japan .................. 53-88401

[51] Int. Cl.³ ............... F01D 17/00; F01D 19/00
[52] U.S. Cl. .................... 415/1; 415/106; 415/110
[58] Field of Search ............ 415/1, 106, 107, 110–112, 415/175, 500

[56] References Cited

U.S. PATENT DOCUMENTS

| | | | |
|---|---|---|---|
| 3,890,059 | 6/1975 | Takase | 415/1 |
| 4,014,624 | 3/1977 | Takase et al. | 415/1 |
| 4,073,594 | 2/1978 | Takagi et al. | 415/1 |
| 4,158,525 | 6/1979 | Kawabe et al. | 415/1 |
| 4,179,237 | 12/1979 | Ogiwara et al. | 415/1 |

*Primary Examiner*—Billy J. Wilhite
*Assistant Examiner*—Timothy F. Simone
*Attorney, Agent, or Firm*—Thomas E. Beall, Jr.

[57] ABSTRACT

For rotating the runner of a fluid machine in compressed air atmosphere in the runner chamber after shutting off working water and feeding compressed air to the runner chamber to move the liquid level therein downwardly below the runner while discharging water remaining in the outer peripheral portion of the runner through a leak-water exhaust pipe following starting of pump-operation, an inlet valve opening detector is mounted and operatively connected to a leak-water exhaust valve controller for controlling a leak-water exhaust valve. Stable operation of the fluid machine in spinning-in-air mode can be achieved by opening the leak-water exhaust valve by means of the leak-water exhaust valve controller following lapse of a given period of time after the inlet valve is fully closed, to permit the water remaining in the outer peripheral portion of the runner to be discharged through the leak-water exhaust pipe.

9 Claims, 5 Drawing Figures

METHOD FOR OPERATING FLUID MACHINES IN SPINNING-IN-AIR MODE

BACKGROUND OF THE INVENTION

This invention relates to a method for operating fluid machines in spinning-in-air mode.

In this specification, fluid machines include pumps, turbines and reversible pump turbines. Generally, in fluid machines directly connected to a generator-motor, the runner may be rotated by the generator-motor in compressed air atmosphere in the runner chamber after the liquid level in the runner chamber is moved downwardly. Such pattern of operation, which is generally referred to as a spinning-in-air mode operation, is practiced also for producing a so-called standby condition which permits immediate switch-over to a power-generating or pumping-up operation for producing initial torque of the generator-motor at starting of pump-operation or for improving power factor of the transmission system.

In one method known in the art for practicing a spinning-in-air mode operation, as exemplified by U.S. Pat. No. 4,179,237, main machinery consisting of the reversible pump turbine and motor-generator is shut down and the liquid level in the runner chamber is moved downwardly before a starting electric motor is actuated to rotate the runner and increase its number of revolutions until the rated rotational speed is attained. This method is similar to the ordinary method for starting pump-operation. In a second method known in the art, the inlet valve is opened to fill the casing with water, the guide vane is opened to a predetermined degree of opening to rotate the runner, and the number of revolutions of the runner is increased until the runner speed reaches its rated speed. After the fluid machine and the generator-motor are connected in parallel with the transmission system, the guide vane is fully closed and compressed air is fed to the runner chamber to move the liquid level therein downwardly below the runner to permit the latter to rotate in compressed air atmosphere in the runner chamber. In the one method, the liquid level can be moved downwardly relatively easily because the main machinery is in-operative. However, this one method has the disadvantages that there is a need to mount the starting electric motor and that it takes time for the runner to attain its rated speed of rotation. Therefore, it is customary to use the second method for practicing spinning-in-air mode operation of a fluid machine. The present invention relates to improvements in the second method.

In this second method, proposals have been made to effect control of thrust acting on the runner by means of a leak-water exhaust pipe, a leak-water exhaust valve and an air exhaust valve which influence the pressure in the runner crown chamber and the runner band chamber formed on the upper side and the lower side respectively of the runner. A method and apparatus for practicing this second method of operation is disclosed in U.S. Pat. No. 3,890,059, for example.

When a fluid machine is to be operated in spinning-in-air mode according to the second method, the guide vane is fully closed after the rotational speed of the runner has reached its rated speed and the main machinery is connected in parallel with the transmission system, and then compressed air is fed to the runner chamber to move the liquid level therein downwardly below the runner while at the same time closing of the inlet valve is begun, as aforesaid. The water present in the runner chamber would be readily subjected to the influences of centrifugal forces produced by the blades of the runner so that a certain amount of water would form an air curtain in the outer peripheral portion of the runner without being moved downwardly to a level below the runner in the runner chamber. Also, water leaking through the side gap of the guide vane and the cooling water supplied to the runner sealing sections would be scattered to the outer peripheral portion of the runner, thereby increasing torque of the runner rotating in compressed air atmosphere in the runner chamber.

Therefore, in the aforesaid second method for practicing spinning-in-air mode operation of a fluid machine, an attempt has been made to reduce torque of the runner rotating in compressed air atmosphere in the runner chamber by discharging the residual water through the leak-water exhaust pipe mounted either at the lower cover or the upper cover or between the runner and the guide vane by opening the leak-water exhaust valve mounted in the leak-water exhaust pipe, after the guide vane is fully closed and the liquid level in the runner chamber is moved downwardly below the runner.

However, when the volume of water in the runner chamber is large and the pressure thereof is high, the volume of water discharged through the leak-water exhaust pipe into the draft pipe per unit time would be great because the pressure differential between the interior of the draft pipe and the water in the runners chamber is large. Thus the liquid level moved downwardly by compressed air must cover a large distance in its downward movement, and consequently it might become impossible to continue the spinning-in-air mode operation. This problem may be solved by moving the open end of the leak-water exhaust pipe on the draft pipe side to a lower level to prevent the liquid level in the runner chamber from being influenced by the water discharged through the leak-water exhaust pipe, or by moving the liquid level to a position much lower than the position to which the liquid level has hitherto been moved downwardly by the compressed air. However, such solutions to the problem would entail an increase in the length of piping or an increase in the size of liquid-level pushing-down equipment because an increased volume of water must be handled in moving the liquid level downwardly in the runner chamber.

SUMMARY OF THE INVENTION

This invention has as its object the provision of a method and apparatus for operating fluid machines in spinning-in-air mode, wherein the time at which leak-water exhaust valve means is opened is controlled for achieving stable running of the fluid machine in spinning-in-air mode.

One of the outstanding characteristics of the present invention is that, in a method for operating fluid machines wherein the runner is rotated in compressed air atmosphere in the runner chamber after shutting off working water and feeding compressed air to the runner chamber to move the liquid level therein downwardly below the runner while discharging water remaining in the outer peripheral portion of the runner through leak-water exhaust pipe means following starting of pump-operation, the opening of leak-water exhaust valve means is increased at the time the pressure in the outer peripheral portion of the runner becomes substantially equal to the draft water pressure.

Another outstanding characteristic is that, in an apparatus for operating fluid machines wherein the runner is rotated in compressed air atmosphere in the runner chamber after shutting off working water and feeding compressed air to the runner chamber to move the liquid level therein downwardly below the runner while discharging water remaining in the outer peripheral portion of the runner through leak-water exhaust pipe means following starting of pump-operation, there are provided inlet valve opening detector means for detecting the opening of the inlet valve, and leak-water exhaust valve controller means operatively connected to the inlet valve opening detector means for opening leak-water exhaust valve means after a given period of time has elapsed following full closure of the inlet valve.

DETAILED DESCRIPTION OF THE PREFERRED EMBODIMENTS

Figure 1:
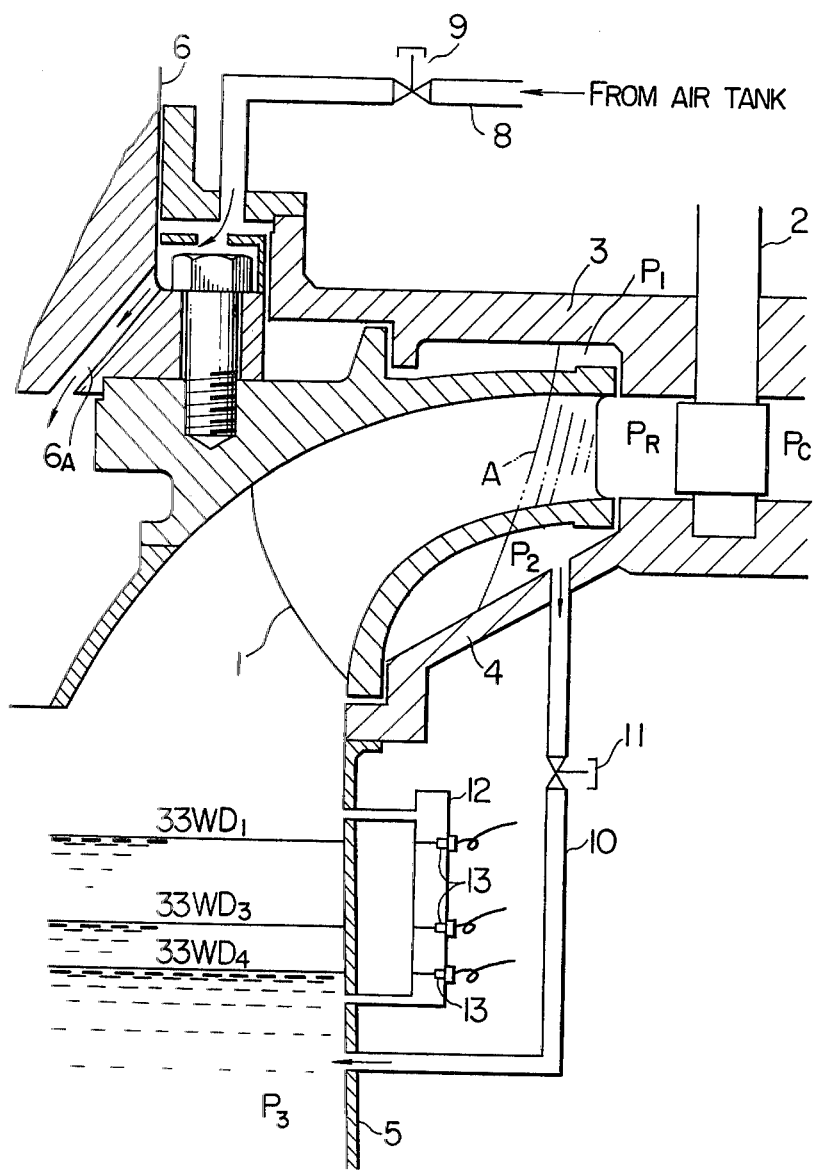
FIG. 1 is a sectional side view of a fluid machine used nowadays, showing the conditions of the nearby parts of the runner.

FIG. 1 shows the conditions of the nearby parts of a runner 1 of a fluid machine when the fluid machine is in spinning-in-air mode operation. A guide vane 2 is mounted outwardly of the outer peripheral portion of the runner 1 which is enclosed at its upper surface by an upper cover 3 and at its underside by a lower cover 4, so that a runner crown chamber is defined between the runner 1 and the upper cover 3 and a runner band chamber is defined between the runner 1 and the lower cover 4. Mounted in the portion of the upper cover 3 disposed near a main shaft 6 to which the runner 1 is directly connected is an air feed pipe 8 for feeding compressed air through an air feed valve 9 and an opening 6A formed in the main shaft 6 to a runner chamber to move the liquid level in a draft pipe 5 downwardly below the runner 1, to thereby permit the runner 1 to rotate in compressed air atmosphere in the runner chamber.

Mounted at the lower cover 4 positioned against the outer peripheral portion of the runner 1 is a leak-water exhaust pipe 10 having a leak-water exhaust valve 11 therein for permitting leak-water to flow therethrough into the draft pipe 5.

A liquid level detector 12 for detecting the liquid levels moved downwardly by the compressed air is mounted in the draft pipe 5 and has electrodes 13 disposed in liquid level positions 33WD$_1$, 33WD$_3$ and 33WD$_4$ and having a current passed thereto. Liquid level 33WD$_1$ is an alerting liquid level for stopping the main machinery to prevent the runner 1 rotating in compressed air atmosphere from coming into contact with water due to a rise in the liquid level caused by leak of air through water sealing sections of the main shaft 6 after the liquid level has been once moved downwardly. Liquid level 33WD$_3$ is an air feed valve opening liquid level for opening the air feed valve 9 to feed compressed air again to the runner chamber to move the liquid level downwardly when the liquid level is raised by some factor after being once moved downwardly. Liquid level 33WD$_4$ is an air feed valve closing liquid level for closing the air feed valve to shut off compressed air when the liquid level has reached this level in its downward movement.

It takes some time for the air feed valve 9 to be fully closed after it begins to close following the arrival of the liquid level to the air feed valve closing liquid level 33WD$_4$. Therefore, in actual practice, the liquid level is moved downwardly below liquid level 33WD$_4$.

Figure 2:
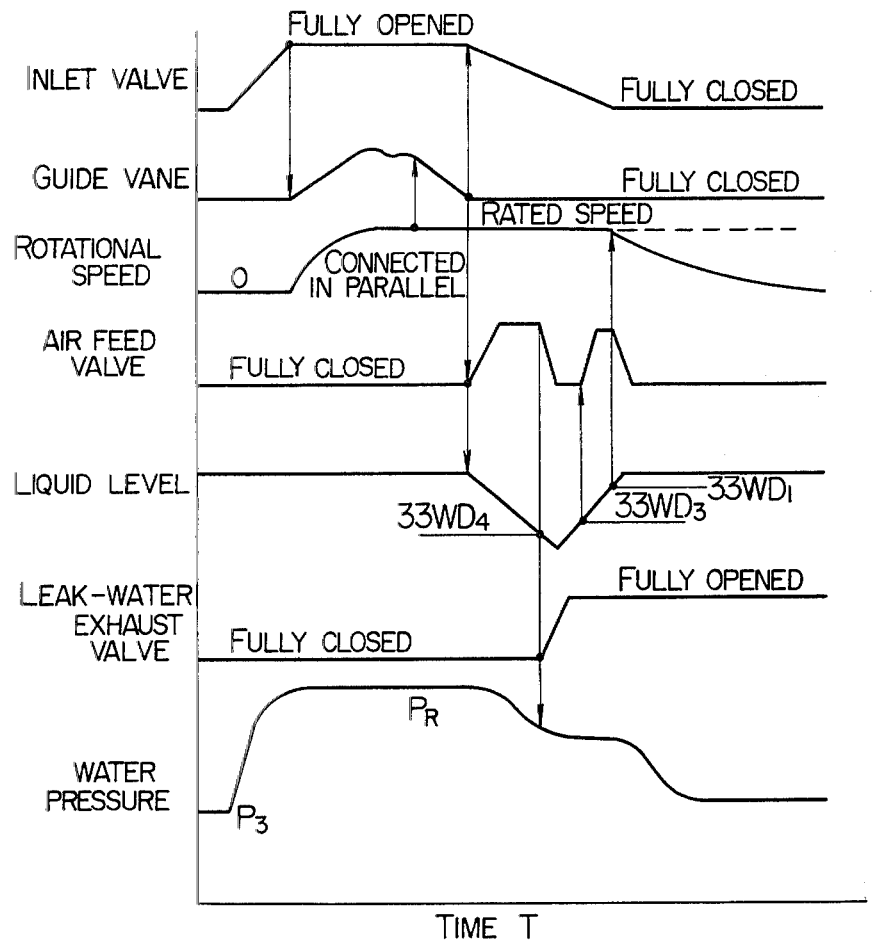
FIG. 2 is a diagrammatic representation of a method for operating a fluid machine in spinning-in-air mode of the prior art.

FIG. 2 is a diagrammatic representation of the operation of a fluid machine in spinning-in-air mode of the prior art. In this example of the prior art, the air feed valve 9 mounted in the air feed pipe 8 is opened to feed compressed air to the runner chamber through the upper cover 3 to move the liquid level in the runner chamber downwardly below the runner while at the same time an inlet valve for water begins to close, after the guide vane 2 is fully closed following the attainment of the rated speed by the runner 1.

When the liquid level in the runner chamber is moved downwardly by the compressed air fed thereto while the runner is rotating, the water present in the runner chamber would be subjected to centrifugal forces produced by the runner; because water has a larger specific gravity than air, all the water would not be moved downwardly and some water would remain and form an air curtain in the outer marginal portion of the runner 1 as indicated at A in FIG. 1, thereby increasing torque of the runner in spinning-in-air mode operation. Also, water leaking through the side gap in the guide vane 2 and the cooling water fed to the runner sealing sections would also increase torque of the runner in spinning-in-air mode operation if they were scattered to the outer peripheral portion of the runner 1.

To obviate this trouble, in the method for operating a fluid machine in spinning-in-air mode of the prior art, the leak-water exhaust valve 11 mounted in the leak-water exhaust pipe 10 mounted at least at one of the lower cover 4 or the upper cover 3 or between the runner 1 and guide vane 2 is opened to discharge water collected in the outer peripheral portion of the runner through the leak-water exhaust pipe 10 to reduce torque of the runner 1 in spinning-in-air mode operation, after the guide vane 2 is fully closed and the liquid level in the runner chamber is moved downwardly below the runner 1.

In the conventional method for practicing spinning-in-air mode operation of a fluid machine of the prior art, a pressure Pc on the casing side of the guide vane 2 is high and the amount of water leaking through the side gap of the guide vane 2 is large because the inlet valve is not fully closed immediately after completion of the downward movement of the liquid level in the runner chamber, and a priming water pressure $P_R$ between the runner 1 and guide vane 2, a back pressure $P_1$ between the runner 1 and the upper cover 3 and a lateral pressure $P_2$ between the runner 1 and the lower cover 4 also have high values because the water in the runner chamber is large in volume.

Therefore, if the leak-water exhaust valve 11 is opened while the pressures in the outer peripheral portion of the runner 1 are still high as aforesaid, then a large volume of water will be discharged per unit time through the leak-water exhaust pipe 10 into the draft pipe 5 because the pressure difference between the lateral pressure $P_2$ and a pressure $P_3$ within the draft pipe 5 is large. In recent years, fluid machines have tended to have a higher head, a runner of a smaller outlet diameter, a draft pipe 5 of a smaller volume, and a tailrace of an increased length. In the fluid machines of this type, the liquid level in the draft pipe will rise in an amount commensurate with the volume of water discharged through the leak-water exhaust pipe 10 from the outer peripheral portion of the runner into the draft pipe 5, until the liquid level reaches air feed valve opening liquid level 33WD$_3$, so that the air feed valve 9 will be opened to move the liquid level downwardly again. In the event that the volume of water discharged through the leak-water exhaust pipe 10 is large, the liquid level will reach alerting liquid level 33WD$_1$ due to the feeding of compressed air through the air feed valve 9 being unable to hold the liquid level down. Thus the main machinery will be shut down, thereby making it impossible to continue the operation of the fluid machine in spinning-in-air mode.

Figure 3:
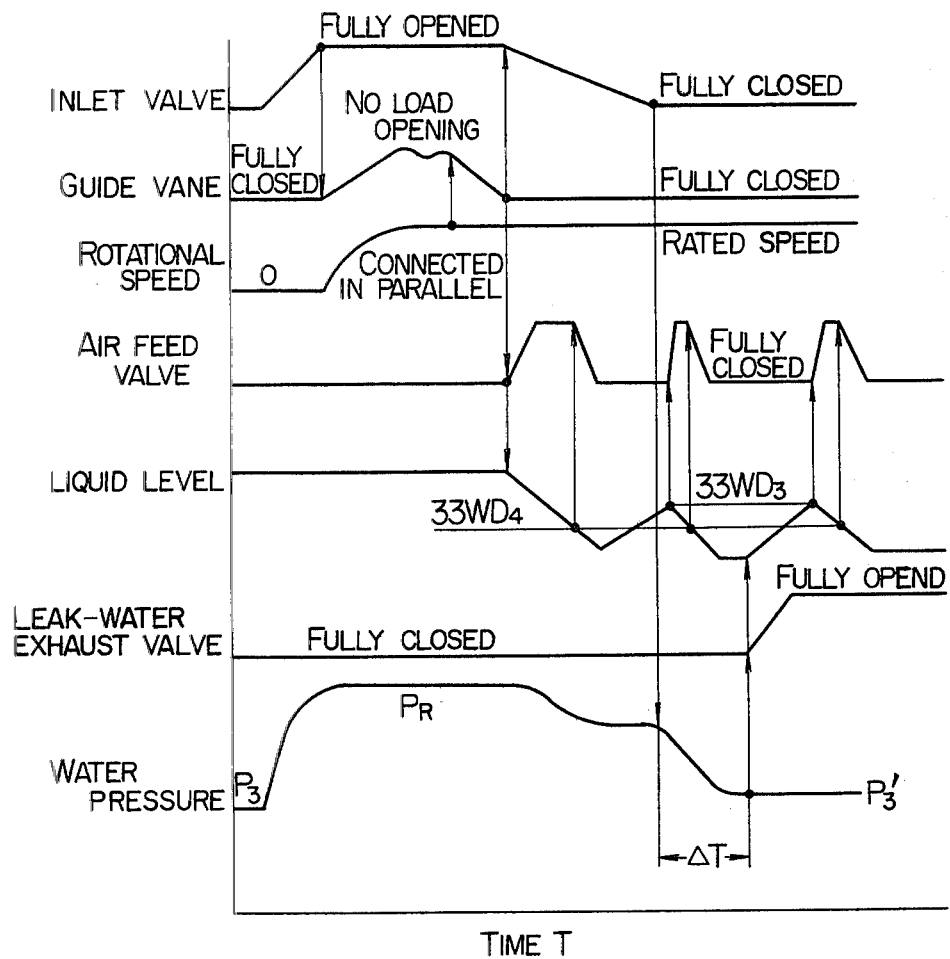
FIG. 3 is a diagrammatic representation of a method for operating a fluid machine in spinning-in-air mode according to the present invention.

One embodiment of the present invention will now be described. FIG. 3 shows a diagram in explanation of the method for operating a fluid machine in spinning-in-air mode according to the present invention. The water pressure shown in FIG. 3 represents a presusre in the outer peripheral portion of the runner 1. Of the back pressure $P_1$, lateral pressure $P_2$ and priming water pressure $P_R$ showing the same tendency to change with respect to time, the priming water pressure $P_R$ having the highest value is shown in FIG. 3 as typical of the pressures in the outer marginal portion of the runner 1.

In this method for operating the fluid machine in spinning-in-air mode, the inlet valve is opened to raise the pressure within the casing upon instructions for starting a spinning-in-air mode operation being given. Then the guide vane 2 is opened to its opening at no load, so that the runner 1 will be rotated by the water under high pressure in the casing. The generator-motor directly connected to the runner 1 and the runner are connected in parallel with the transmission system when the rotational speed of the main machinery has reached its rated speed. Then the guide vane 2 is fully closed and the air feed valve 9 is opened to introduce compressed air into the runner chamber to move the liquid level therein downwardly below the runner 1 while closing of the inlet valve is begun at the same time. When the downwardly moving liquid level reaches air feed valve closing liquid level 33WD$_4$, the air feed valve 9 is closed.

The priming water pressure $P_R$ typical of the pressures in the outer peripheral portion of the runner 1 might be reduced to a certain degree as the liquid level in the runner chamber is moved downwardly. However, the pressure within the casing is high and the water leaking through the side gap of the guide vane 2 is large in volume because the water is scattered by the centrifugal forces produced by the blades of the runner 1 rotating while the liquid level is being moved downwardly and the inlet valve is not fully closed yet, so that the priming water pressure $P_R$ has a considerably high value.

If the inlet valve is fully closed at this time, the pressure $P_c$ on the casing side of the guide vane 2 will show a sudden drop and the water leaking through the side gap of the guide vane 2 will be reduced in volume, causing an abrupt drop in the priming water pressure $P_R$ (or back pressure $P_1$ or lateral pressure $P_2$) typical of the pressures in the outer peripheral portion of the runner 1. Thus the priming water pressure $P_R$ drops to a level $P_3'$ substantially equal to that of the draft water pressure $P_3$ in a given period of time $\Delta T$. The leak-water exhaust valve 11 is opened to permit the water collected in the outer peripheral portion of the runner 1 to be discharged through the leak-water exhaust pipe 10 to the draft pipe 5, at the time the pressure in the outer peripheral portion of the runner 1 substantially reaches the level of the draft water pressure. In this case, since the pressure difference between the pressure in the outer peripheral portion of the runner 1 and the draft water pressure $P_3$ is small, the volume of water discharged through the leak-water exhaust pipe 10 per unit time to the draft pipe 5 will be small. Thus the liquid level in the draft pipe 5 will not be suddenly moved upwardly and stable spinning-in-air mode operation can be achieved.

Figure 4:
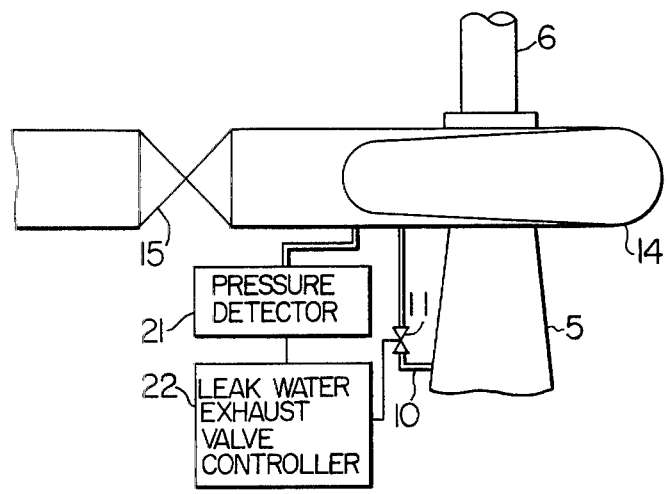
FIG. 4 is a schematic view of the apparatus comprising one embodiment of the invention suitable for carrying into practice the method for operating a fluid machine in spinning-in-air mode of the invention, particularly showing piping of the apparatus.

FIG. 4 shows an apparatus suitable for carrying the aforesaid method into practice. An inlet valve 15 is mounted on the water channel side of a casing 14, and the leak-water exhaust pipe 10 mounting the leak-water exhaust valve 11 therein is mounted between the portion of the casing 14 near the outer peripheral portion of the runner 1 and the draft pipe 5. A pressure detector 21 for detecting one of the priming water pressure $P_R$, back pressure $P_1$ and lateral pressure $P_2$ is connected to the portion of the casing 14 near the outer peripheral portion of the runner 1, and a leak-water valve controller 22 for actuating the leak-water exhaust valve 11 is operatively connected to the pressure detector 21.

In the operating apparatus described hereinabove, the pressure detector 21 actuates the leak-water exhaust valve controller 22 to cause same to open the leak-water exhaust valve 11, at the time the pressure in the outer peripheral portion of the runner 1 substantially reaches the level of the draft water pressure.

In the description of the method for practicing spinning-in-air mode operation, the time at which the leak-water exhaust valve 11 is opened has been described as being the time at which the pressure in the outer peripheral portion of the runner 1 substantially reaches the level of the draft water pressure. However, the pressure in the outer peripheral portion of the runner 1 shows a tendency to drop with time, because the water leaking through the side gap of the guide vane 2 is reduced in volume and the water curtain A becomes small in size as a result of full closure of the inlet valve 15 and a drop in the pressure $P_c$ in the casing 14. Accordingly, the time at which the pressure in the outer peripheral portion of the runner 1 substantially reaches the level of the draft water pressure may be considered to coincide with the time at which a given period of time $\Delta T$ has elapsed following full closure of the inlet valve 15, as shown in FIG. 3.

In the embodiment shown in FIG. 3, the leak-water exhaust pipe has its opening varied from full closure to full open. However, this is not essential. After all, the desired effects can be achieved by the present invention if the opening is increased. Therefore, the opening of this valve may range from slightly open to full open or from 10% open to 80% open.

Figure 5:
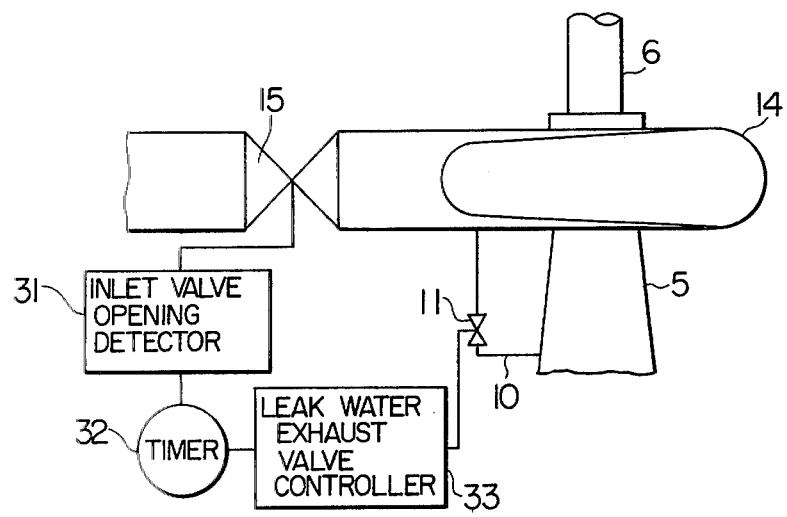
FIG. 5 is a schematic view of the apparatus comprising another embodiment of the invention suitable for carrying into practice the method for operating a fluid machine in spinning-in-air mode of the invention, particularly showing piping of the apparatus.

FIG. 5 shows an example of the apparatus for operating a fluid machine in spinning-in-air mode suitable for carrying into practice the method consisting in opening the leak-water exhaust valve after a given period of time has elasped following full closure of the inlet valve. As shown, the inlet valve 15 has mounted therein an inlet valve opening detector 31 for detecting the opening of the inlet valve 15, which produces an output transmitted, by way of a timer 32, to a leak-water exhaust valve controller 33 connected to the leak-water exhaust valve 11 to acutate same. In operation, the inlet valve opening detector 31 detects the full closure of the inlet valve 15 and supplies an output to the leak-water exhaust valve controller 33 after a given period of time has elapsed following full closure of the inlet valve 15. Upon receipt of the output of detector 31, the leak-water exhaust valve controller 33 actuates the leak-water exhaust valve 11 and opens same.

Before the leak-water exhaust valve 11 is opened, the water collected in the outer peripheral portion of the runner 1 may be gradually released through gaps in the runner sealing sections to the draft pipe 5 and cause the liquid level in the draft pipe 5 to rise slightly as the result of replacing of air by water. When this is the case, the liquid level in the draft pipe can be positively moved downwardly to increase the safety of operation of the fluid machine in spinning-in-air mode by moving the liquid level downwardly again below air feed valve closing liquid level 33WD$_4$ by forcedly feeding compressed air again before opening the leak-water exhaust valve 11 even if the liquid level does not reach air feed valve opening liquid level 33WD$_3$, and by opening the leak-water exhaust valve 11 after a given period of time has elapsed following full closure of the inlet valve 15.

From the foregoing description, it will be appreciated that the present invention can achieve the excellent effects of enabling safe and stable spinning-in-air mode operation of a fluid machine to be practiced by controlling the time for opening the leak-water exhaust valve and preventing the liquid level from rising again after being moved downwardly.

What is claimed is:

1. A method for operating a fluid machine in a spinning-in-air mode in synchronism with a transmission system, wherein the fluid machine includes a serial arrangement of working fluid inlet valve, closeable guide vanes, runner within a runner chamber of a casing and draft pipe, so as to define a water retaining chamber immediately adjacent the outer peripheral portion of the runner that will tend to retain water during rotation of the runner in spinning-in-air mode and further includes a leak-water exhaust valve in a pipe having an inlet in the water retaining chamber and a discharge in the draft tube, comprising the steps of:

with the runner drivingly connected in synchronism with the system and drivingly connected with a rotary machine having power to rotate the runner, and with the runner operating under no load with the inlet valve and guide vanes open and passing working fluid toward and through the runner, closing the guide vanes to shut off the flow of working fluid through the runner;

thereafter feeding compressed air to the runner chamber to fill the runner chamber within the casing with compressed air and lower the working fluid level in the draft pipe below the runner while continuing rotating the runner in synchronism so that the runner is rotating primarily in compressed air with working fluid remaining in the water retaining chamber between the runner and closeable guide vanes and closing the inlet valve; and thereafter opening the leak-water exhaust valve to simultaneously pass the water from the water retaining chamber directly to the draft tube while bypassing the runner, which such opening being conducted after the inlet valve has closed and the pressure within the water retaining chamber substantially equals the pressure within the draft tube while maintaining the synchronized rotational speed of the runner so as to prevent excess rise of water within the draft pipe.

2. A method for operating fluid machines in accordance with claim 1, including the steps of:

automatically detecting a low water level in the draft pipe and shutting off the supply of compressed air to the runner chamber in response to detection of the water level reaching such lower level;

automatically detecting an intermediate water level above said lower water and initiating feeding of compressed air into the runner chamber in response to detecting the intermediate water level;

automatically detecting an upper water level above said intermediate water level and discontinuing the supply of power to said runner to discontinue synchronous running of said runner in response to detecting rising of the water level in the draft pipe to the upper water level; and conducting said step of opening the leak-water exhaust valve after a fixed period of time after closing of the inlet valve, with the fixed period of time being sufficiently long so that the difference in volume of water removed through the leak-water exhaust valve and compressed air admitted to the runner chamber will not exceed the difference in volume in the draft pipe between the upper water level and intermedicate water level.

3. The method for operating fluid machines in accordance with claim 2, including the step of feeding compressed air into the runner chamber immediately before initiating said step of opening the leak-water exhaust valve irrespective of the water level within the draft pipe.

4. The method of operating fluid machines in accordance with claim 2, including the steps of:

automatically sensing the closure of the inlet valve and timing the period after closure; and automatically initiating said step of opening the leak-water exhaust valve after a fixed period of time following the closure of said inlet valve.

5. The method for operating fluid machines in accordance with claim 4, including the step of feeding compressed air into the runner chamber immediately before initiating said step of opening the leak-water exhaust valve irrespective of the water level within the draft pipe.

6. The method for operating fluid machines in accordance with claim 1, including the steps of:

automatically sensing the closure of the inlet valve and timing the period after closure; and automatically initiating said step of opening the leak-water exhaust valve after a fixed period of time following the closure of said inlet valve.

7. The method for operating fluid machines in accordance with claim 1, further including the steps of:

automatically detecting the pressure of the remaining water within the water retaining chamber;

automatically comparing the detected pressure with pressure within the draft tube and initiating said step of opening the leak-water exhaust valve only after the compared pressure difference falls below a fixed pressure difference representative of the pressure in the water retaining chamber being substantially equal to the effective draft tube pressure.

8. The method for operating fluid machines in accordance with claim 7, including the steps of:

automatically detecting a low water level in the draft pipe and shutting off the supply of compressed air to the runner chamber in response to detection of the water level reaching such lower level;

automatically detecting an intermediate water level above said lower water level and initiating feeding of compressed air into the runner chamber in response to detecting the intermediate water level;

automatically detecting an upper water level above said intermediate water level and discontinuing the supply of power to said runner to discontinue synchronous running of said runner in response to detecting rising of the water level in the draft pipe to the upper water level; and conducting said step of opening the leak-water exhaust valve after the pressure difference is sufficiently low that the difference in volume of water removed through the leak-water exhaust valve and compressed air admitted to the runner chamber will not exceed the difference in volume in the draft pipe between the upper water level and intermediate water level.

9. The method for operating fluid machines in accordance with claim 8, including the step of feeding compressed air into the runner chamber immediately before initiating said step of opening the leak-water exhaust valve irrespective of the water level within the draft pipe.

* * * * *